US008504027B2

(12) United States Patent
Oh

(10) Patent No.: US 8,504,027 B2
(45) Date of Patent: Aug. 6, 2013

(54) DATA-COMMUNICATION SYSTEM SCANNING METHOD AND APPARATUS OF A DUAL MODE MOBILE DEVICE

(75) Inventor: Se Wan Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 13/100,207

(22) Filed: May 3, 2011

(65) Prior Publication Data
US 2011/0275368 A1    Nov. 10, 2011

(30) Foreign Application Priority Data

May 4, 2010    (KR) .................. 10-2010-0041662

(51) Int. Cl.
*H04W 4/00*    (2009.01)
*H04W 36/00*    (2009.01)
(52) U.S. Cl.
USPC .................. 455/434; 455/436; 455/432.1
(58) Field of Classification Search
USPC .......................... 455/432.1–444
See application file for complete search history.

(56) References Cited

U.S. PATENT DOCUMENTS

2001/0021179 A1*   9/2001   Tiedemann et al. .......... 370/333

* cited by examiner

*Primary Examiner* — Steven Lim

(57) ABSTRACT

A data-communication system scanning method and apparatus of a dual mode mobile device. The method includes acquiring a mobile communication system and storing a local time used by the acquired mobile communication system. The method also includes identifying a local time used by a data communication system sensed and determining whether the local time used by the acquired mobile communication system is identical to the local time used by the sensed data communication system. The method further includes scanning, when the local time used by the acquired mobile communication system differs from the local time used by the sensed data communication system, data communication systems by excluding the sensed data communication system from target systems to be scanned. The system scanning method and apparatus can provide precise time information to users and prevents the dual mode mobile device from malfunctioning.

20 Claims, 6 Drawing Sheets

DATA-COMMUNICATION SYSTEM SCANNING METHOD AND APPARATUS OF A DUAL MODE MOBILE DEVICE

CROSS-REFERENCE TO RELATED APPLICATION(S) AND CLAIM OF PRIORITY

The present application is related to and claims the benefit under 35 U. S.C. §119 a of a Korean patent application filed in the Korean Intellectual Property Office on May 4, 2010 and assigned Serial No. 10-2010-0041662, and the entire disclosure of which is hereby incorporated by reference.

TECHNICAL FIELD OF THE INVENTION

This invention relates to dual mode communication systems. More particularly, the invention relates to a data-communication system scanning method and apparatus of a dual mode mobile device that can scan data communication systems, excluding a data communication system that is using a local time that differs from a local time used by an acquired mobile communication system.

BACKGROUND OF THE INVENTION

With the increase in the complexity of RF network systems, mobile devices are often equipped with functions in such a manner that one mobile device can support different types of communication network systems. This has lead to the development of dual mode mobile devices. Dual mode mobile devices or hybrid mobile devices refer to mobile devices that can support at least two or more forms of RF communication technology, i.e., at least two or more RF communication services. Therefore, a user can enjoy a variety of communication services using the dual mode mobile device.

For example, dual mode mobile devices are implemented to support part or all of RF communication network systems, i.e., mobile communication systems, data communication systems, and the like. Examples of the mobile communication systems are Code Division Multiple Access (CDMA), Wideband Code Division Multiple Access (W-CDMA), and the like. Examples of the data communication systems are Wireless Local Area Network (WLAN), Wibro, WiFi, High Data Rate (HDR), and the like. In particular, HDR refers to a data communication technology that provides high-speed packet data transmission. HDR optimizes a system in order to transmit packet data at high-speed, so that the system can transfer the data, for example, texts, video, and so forth, at a data transfer rate of up to 2.45 Mbit/sec in a 1.25 MHz channel.

Dual mode mobile devices scan and acquire a mobile communication system using a Preferred Roaming List (PRL), and then scan and acquire a data communication system that has the same association tag as the acquired mobile communication system from the PRL.

However, in a time zone boundary area, i.e., a boundary region between time zones, conventional dual mode mobile devices may acquire a data communication system that uses a local time that differs from a local time used by a currently acquired mobile communication system. In this situation, the conventional dual mode mobile devices may provide incorrect time information to the users. In addition, since conventional dual mode mobile devices acquire a data communication system and a mobile communication system that cannot achieve mutual synchronization, they may malfunction.

Therefore, in a time zone boundary area, a technology is required that avoids scanning and acquiring a data communication system that uses a local time that differs from a local time used by an acquired mobile communication system.

SUMMARY OF THE INVENTION

To address the above-discussed deficiencies of the prior art, it is a primary object to provide a data-communication system scanning method and apparatus of a dual mode mobile device that can scan data communication systems by excluding a data communication system that is using a local time that differs from a local time used by a currently acquired mobile communication system.

In accordance with an embodiment of the invention, the invention provides a data-communication system scanning method of a dual mode mobile device. The method includes acquiring a mobile communication system. The method also includes storing a local time used by the acquired mobile communication system. The method further includes identifying a local time used by a sensed data communication system. The method also includes determining whether the local time used by the acquired mobile communication system is identical to the local time used by the sensed data communication system. The method further includes scanning, when the local time used by the acquired mobile communication system differs from the local time used by the sensed data communication system, data communication systems by excluding the sensed data communication system from target systems to be scanned.

In accordance with another embodiment of the invention, the invention provides a data-communication system scanning apparatus of a dual mode mobile device. The apparatus includes a mobile communication unit configured to process transmission and reception of signals to scan and acquire a mobile communication system. The apparatus also includes a data communication unit configured to process transmission and reception of signals to scan and acquire a data communication system. The apparatus further includes a local time managing unit configured to acquire a mobile communication system via the mobile communication unit, store a local time used by the acquired mobile communication system, identify a local time used by a data communication system sensed by the data communication unit, and determine whether the local time used by the acquired mobile communication system is identical to the local time used by the sensed data communication system. The apparatus also includes a scanning-operation controlling unit configured to control, when the local time used by the acquired mobile communication system differs from the local time used by the sensed data communication system, the data communication unit to scan data communication systems by excluding the sensed data communication system from target systems to be scanned.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
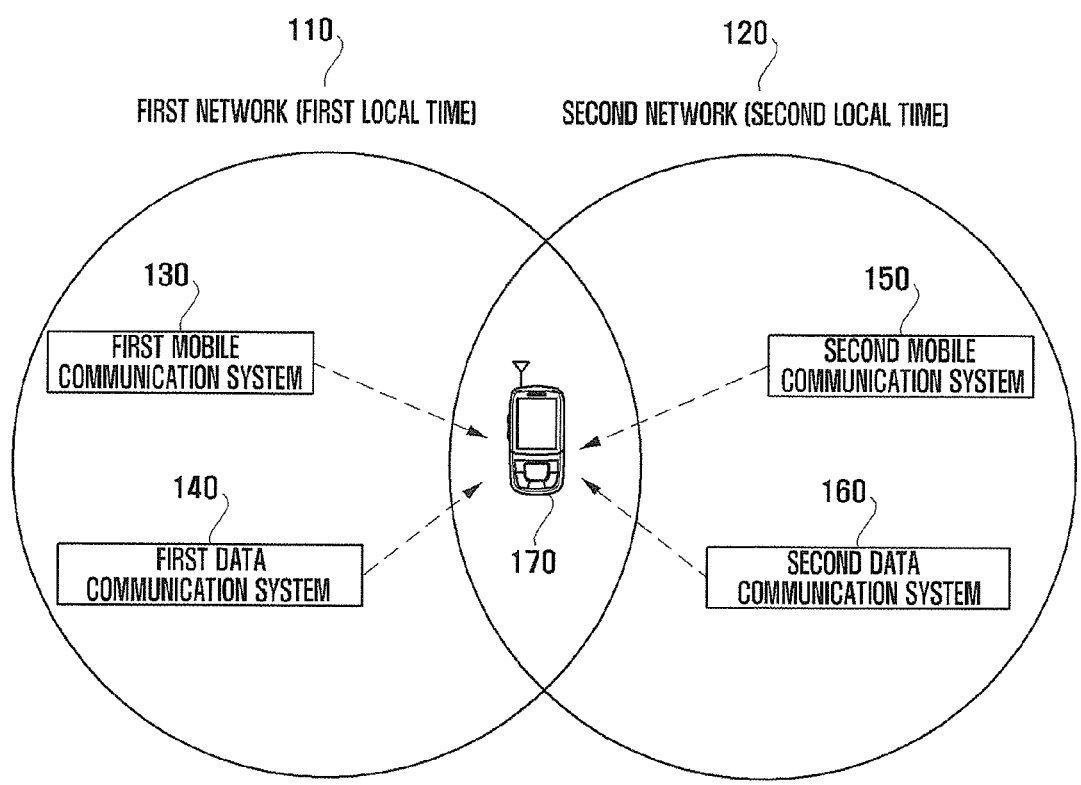
FIG. 1 illustrates a view that describes the concept of a system scanning method of a dual mode mobile device according to an embodiment of the invention.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network. The same reference numbers are used throughout the drawings to refer to the same or similar parts. Detailed descriptions of well-known functions and structures incorporated herein may be omitted to avoid obscuring the subject matter of the invention.

Prior to explaining the embodiments of the invention, terminologies will be defined for the present description below. The terms or words described in the present description and the claims should not be limited by a general or lexical meaning, instead should be analyzed as a meaning and a concept through which the inventor defines and describes the invention at his most effort, to comply with the idea of the invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

In the following description, the term 'mobile communication system' refers to a system that can provide a variety of services, such as a voice or video call service, a text service, a multimedia service, and so forth, to a mobile device wirelessly connected to a base station.

A data communication system refers to a system for high-speed packet data transfer. An HDR is a representative example.

A dual mode mobile device refers to a communication device that can support services provided both via mobile communication systems and via data communication systems. A dual mode mobile device is called a hybrid mobile communication system.

System acquisition refers to a state where a mobile device acquires a control channel transferred from a mobile communication system or a data communication system and operates in a slot mode with respect to the mobile communication system or the data communication system. The slot mode refers to a state where a mobile device repeatedly switches between a sleep mode and an awake mode. That is, the slot mode means a state where each mobile device awakens at an inherently determined slot, monitors a control channel of a base station (i.e., a paging channel), and retains a sleep state at the remaining slots.

FIG. 1 illustrates a view that describes the concept of a system scanning method of a dual mode mobile device 170 according to an embodiment of the invention.

The first network 110 uses a first local time, and provides a communication service to the dual mode mobile device 170 via the first mobile communication system 130 and the first data communication system 140. The first mobile communication system 130 can provide a mobile communication service to the dual mode mobile device 170 via at least one of the communication networks of a series of Code Division Multiple Access (CDMA) or a series of Global System for Mobile communication (GSM). Although FIG. 1 illustrates the first mobile communication system 130 as one block, it should be understood that it can be configured with a number of base stations and their coverage areas. Likewise, the first data communication system 140 can provide a data communication service to the dual mode mobile device 170 via at least one communication mode for high-speed packet data transfer, such as WLAN, Wibro, WiFi, HDR, and the like.

The second network 120 uses a second local time that differs from the first local time, and provides a communication service to the dual mode mobile device 170 via the second mobile communication system 150 and the second data communication system 160. Since the second mobile communication system 150 and the second data communication system 160 are similar to the first mobile communication system 130 and the first data communication system 140, which has already been explained above, their description is omitted below.

When the dual mode mobile device 170 is located in the coverage area of the first network 110 and turned on, it scans a first mobile communication system 130 using its Preferred Roaming List (PRL). The dual mode mobile device 170 receives an overhead message via a paging channel, serving as a control channel of a first mobile communication system 130, and then acquires the first mobile communication system 130.

After acquiring the first mobile communication system 130, the dual mode mobile device 170 scans the PRL to acquire a first data communication system 140 that has the same Association Tag as the first mobile communication system 130 that the dual mode mobile device 170 has already acquired. The dual mode mobile device 170 acquires the first data communication system 140 by acquiring a pilot signal via a Pilot Channel of the first data communication system.

The dual mode mobile device 170, having acquired the first mobile communication system 130 and the first data communication system 140, may be located in the boundary area between the first and second networks. In certain situations, the first and second networks use different local times. The dual mode mobile device 170 can sense signals transmitted from a second data communication system 160 that are providing services in the second network 120.

In addition, the dual mode mobile device 170 also senses signals transmitted from a second mobile communication system 150. Since mobile communication systems provide mobile communication services to the dual mode mobile device 170, they cannot be excluded as target systems to be scanned in order to achieve the objective according to the invention. That is, signals transmitted from the second mobile communication system 150 cannot be excluded as signals that the dual mode mobile device 170 uses to scan systems.

When the dual mode mobile device 170 senses signals transmitted from the second data communication system 160, and the Association Tags between the second data communication system 160 and the first mobile communication system 130 are identical to each other, the dual mode mobile device can scan and acquire the second data communication system 160. However, since the local time of the currently acquired first mobile communication system 130 differs from that of the second data communication system 160, the dual mode mobile device cannot provide precise time information to the user. In addition, since the dual mode mobile device acquires a data communication system and a mobile communication system, with which it cannot be mutually synchronized, it may malfunction.

In order to resolve these problems, when a second data communication system uses a local time that differs from that of a first mobile communication system that is currently acquired by the dual mode mobile device 170, the dual mode mobile device 170 excludes the second data communication system from target systems to be scanned. In the following description, the configuration and operation of the dual mode mobile device 170 are explained in detail referring to FIGS. 2 to 6.

Figure 2:
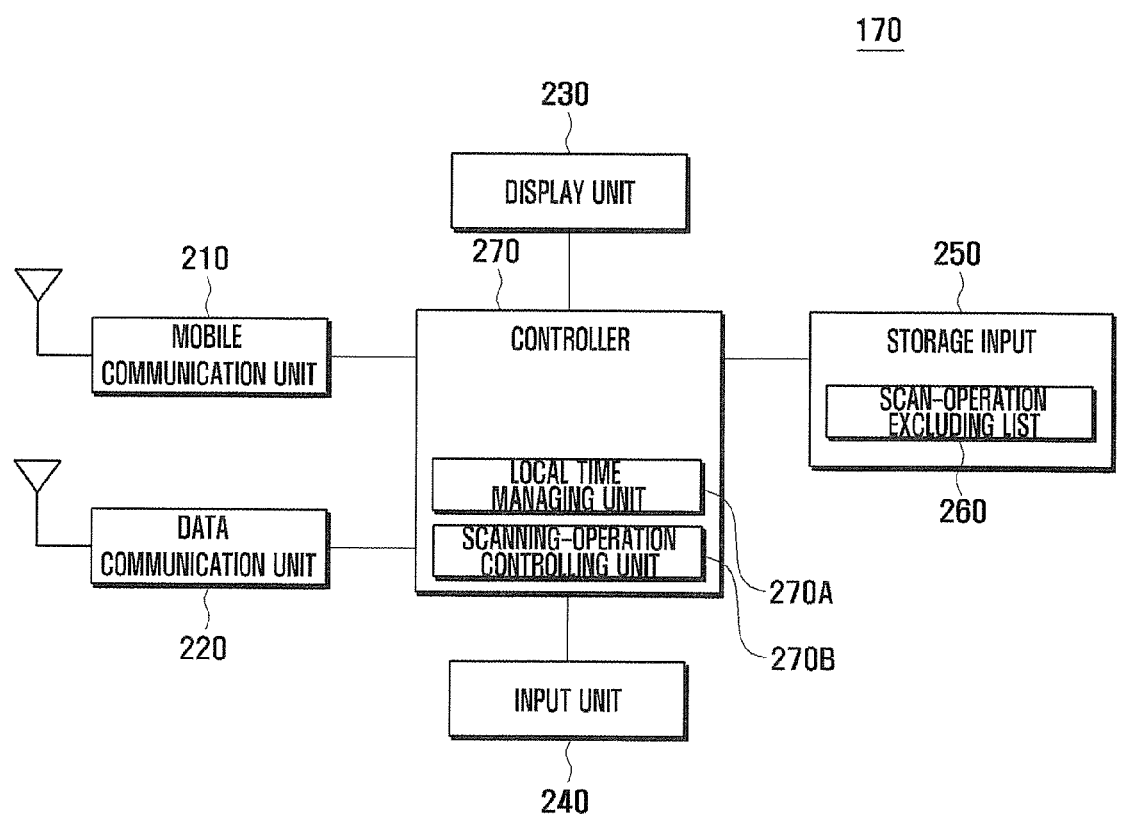
FIG. 2 illustrates a schematic block diagram of a dual mode mobile device according to an embodiment of the invention.

FIG. 2 illustrates a schematic block diagram of a dual mode mobile device 170 according to an embodiment of the invention.

Referring to FIG. 2, the dual mode mobile device 170 includes a mobile communication unit 210, a data communication unit 220, a display unit 230, an input unit 240, a storage input 250, and a controller 270. The storage input 250 stores a scanning-operation excluding list 260. The controller 270 includes a local time managing unit 270A and a scanning-operation controlling unit 270B.

The mobile communication unit 210 processes the transmission and reception of mobile communication signals to acquire a mobile communication system. To this end, the mobile communication unit 210 includes an RF module and a baseband module. The RF module is configured to include an RF transmitter for up-converting the frequency of signals to be transmitted and amplifying the signals and an RF receiver for low-noise amplifying received RF signals and down-converting the frequency of the received RF signals. The mobile communication unit 210 receives control signals and data via an RF channel and outputs them to the controller 270. In addition, the mobile communication unit 210 receives data from the controller 270 and transfers it via the RF channel. In an embodiment, the mobile communication unit 210 receives a synchronous channel message transmitted from a mobile communication system and a sector parameter message transmitted from a data communication system. In addition, the mobile communication unit 210 can also scan communication systems according to the control of the controller 270.

The data communication unit 220 processes transmission and reception of signals to acquire a data communication system. Since the data communication unit 220 includes the same components as the mobile communication unit 210, its detailed description will be omitted in the application.

The display unit 230 may be implemented with a Liquid Crystal Display (LCD), an Organic Light Emitting Diode (OLED), or the like. The display unit 230 displays menus of the dual mode mobile device 170, input data, function-setting information, and other additional information. For example, the display unit 230 can display a booting screen, an idle screen, a call screen, an optional screen for settings, application executing screens of the dual mode mobile device, and the like.

The input unit 240 receives a user's key operation signals for controlling the dual mode mobile device 170 and transfers them to the controller 270. The input unit 240 may be implemented with a keypad that includes numeric keys, directional keys, and the like. The input unit 240 may also be implemented with a function key installed to one side of the dual mode mobile device 170.

The storage input 250 serves to store programs used to operate the dual mode mobile device 170 and data generated when the programs are executed. The storage input 250 is comprised of a program storage area and a data storage area. The program storage area stores an operating system (OS) for booting the dual mode mobile device 170 and an application for configuring an idle screen. The program storage area also stores applications for other options such as a camera function, an audio playback function, still-image or moving-image reproduction function, and the like. When the user requests the respective listed functions in the dual mode mobile device 170, the controller 270 activates corresponding application programs in response to the user's request to provide corresponding functions.

The data storage area refers to an area where data, generated when the dual mode mobile device 170 is used, is stored. The data storage area can store contents transmitted from an external memory or hard disk, or downloaded from web servers via wired or wireless Internet. The data storage area can also store user's data related to various optional functions, for example, photographs or moving images acquired via a camera function, audio files, and the like.

In an embodiment of the invention, the storage input 250 can store a scanning-operation excluding list 260 that contains information regarding data communication systems excluded from target systems to be scanned.

The controller 270 controls the entire operation of the dual mode mobile device 170. In an embodiment, the controller 270 performs a control operation in such a manner to exclude a data communication system from target systems to be scanned, if the data communication system uses a local time that differs from a local time used by a currently acquired mobile communication system. To this end, the controller 270 includes a local time managing unit 270A and a scanning-operation controlling unit 270B.

The local time managing unit 270A identifies, stores and manages a local time used by a mobile communication system or a data communication system. The local time managing unit 270A can identify a local time via a sync channel message transmitted from the mobile communication system. If the dual mode mobile device 170 already acquired the mobile communication system, the local time managing unit 270A can store the identified local time in the storage input 250.

The local time managing unit 270A receives a sector parameter message transmitted from the data communication system, and identifies a local time used by a currently sensed data communication system. If the data communication system is an HDR, the sector parameter message may be an HDR sector parameter message.

The local time managing unit 270A compares a local time used by a currently acquired mobile communication system, with a local time used by a currently sensed data communication system, and transfers the comparison result to the scanning-operation controlling unit 270B.

The scanning-operation controlling unit 270B receives the comparison result from the local time managing unit 270A. When the scanning-operation controlling unit 270B ascertains that the local times, used by a currently acquired mobile communication system and a currently sensed data communication system, differ from each other, the scanning-operation controlling unit 270B performs a control operation in such a manner to exclude a corresponding data communication system from target systems to be scanned. To this end, the scanning-operation controlling unit 270B adds the corresponding data communication system to the scanning-operation excluding list 260. Alternatively, when the scanning-operation controlling unit 270B ascertains that the local times, used by a currently acquired mobile communication system and a currently sensed data communication system, are consistent with each other, the scanning-operation controlling unit 270B performs a control operation in such a manner to include a corresponding data communication system in target systems to be scanned. That is, the scanning-operation controlling unit 270B does not add the corresponding data communication system to the scanning-operation excluding list 260.

When the scanning-operation controlling unit 270B scans data communication systems, it compares the scanning-operation excluding list 260 with the PRL. The scanning-operation controlling unit 270B scans the remaining data communication systems in the scanning-operation list 260, excluding a data communication system that has the same Association Tag as a currently acquired mobile communication system.

The scanning-operation controlling unit 270B may initialize the scanning-operation excluding list when the dual mode mobile device 170 performs a handover operation or enters an out of range area.

As described above, the dual mode mobile device 170 of the invention can exclude a data communication system from target systems to be scanned, if the data communication system uses a local time that differs from a local time used by a currently acquired mobile communication system.

Figure 3:
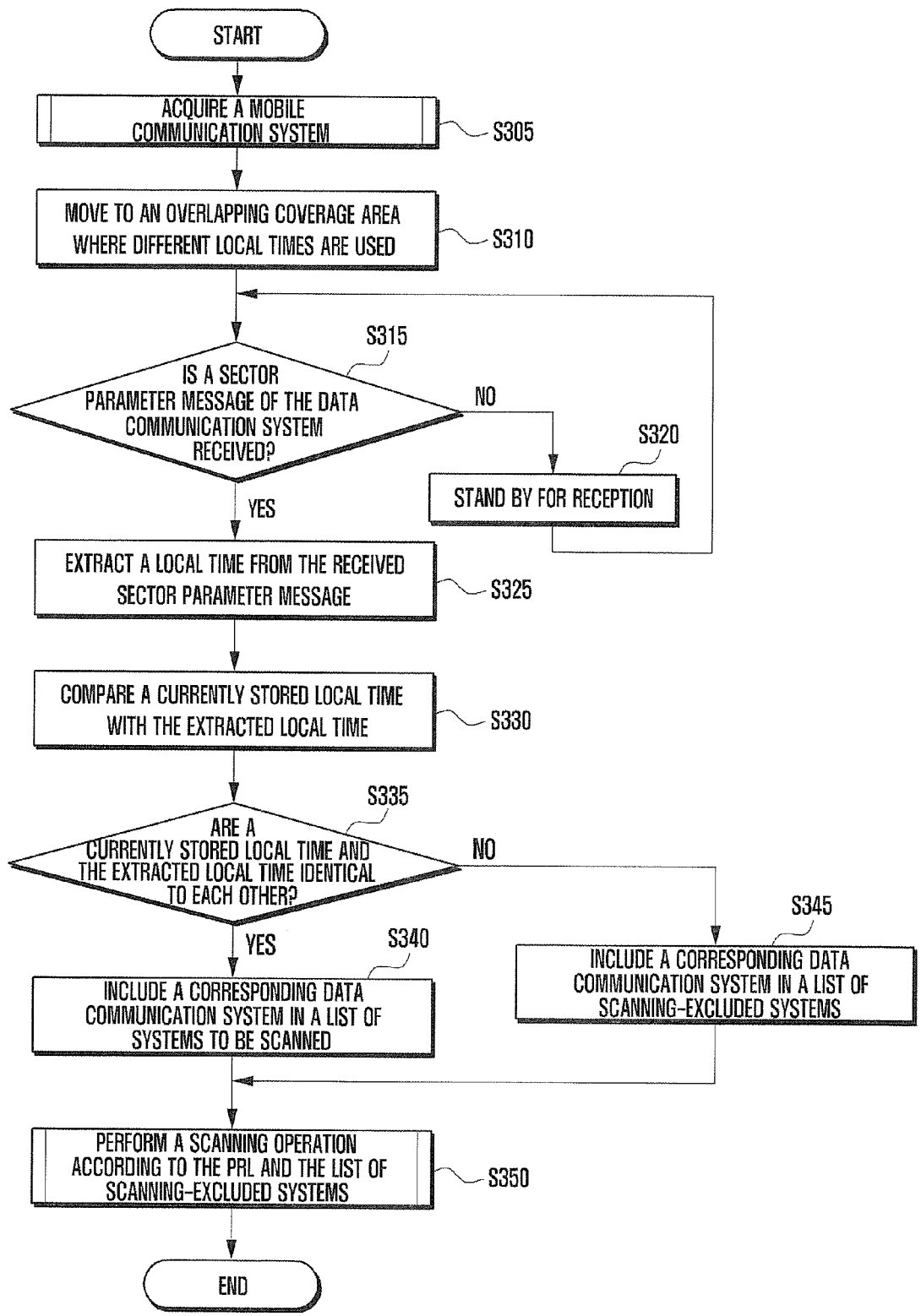
FIG. 3 illustrates a method for controlling system scanning by a controller of the dual mode mobile device, according to an embodiment of the invention.

FIG. 3 illustrates a flow chart that describes a method for controlling system scanning by a controller 270 of the dual mode mobile device 170, according to an embodiment of the invention.

The controller 270 acquires a mobile communication system (S305). Block S305 will be described in detail in the section referring to FIG. 4. The controller 270 senses whether the dual mode mobile device 170 is already located in a superimposed coverage area (S310). The superimposed coverage area means that the communication radius of a currently acquired mobile communication system is superimposed with that of a network that uses a local time that differs from a local time used by the currently acquired mobile communication system. The superimposed coverage area also refers to a time zone boundary area.

The controller 270 determines whether to receive a sector parameter message from a data communication system (S315). When the controller 270 does not receive a sector parameter message from a data communication system at block S315, it enters a message waiting mode (S320).

Alternatively, when the controller 270 receives a sector parameter message from a data communication system at block S315, it extracts a local time from the sector parameter message (S325). The controller 270 compares the extracted local time with a currently stored local time, i.e., a local time used by a currently acquired mobile communication system (S330).

When the controller 270 ascertains that the extracted local time is identical to a currently stored local time (S335), it includes a corresponding data communication system in target systems to be scanned (S340). This is because the controller 270 concludes that, although the dual mode mobile device 170 is located in the superimposed coverage area, the dual mode mobile device 170 has received a sector parameter message from a data communication system that uses the same local time as a currently acquired mobile communication system.

Alternatively, when the controller 270 ascertains that the extracted local time differs from a currently stored local time at block S335, it excludes a corresponding data communication system from target systems to be scanned (S345). To this end, the controller 270 adds the corresponding data communication system to a scanning-operation excluding list.

After that, the controller 270 scans data communication systems using the PRL and the scanning-operation excluding list (S350). The scanning operation will be described in detail referring to FIG. 5.

Figure 4:
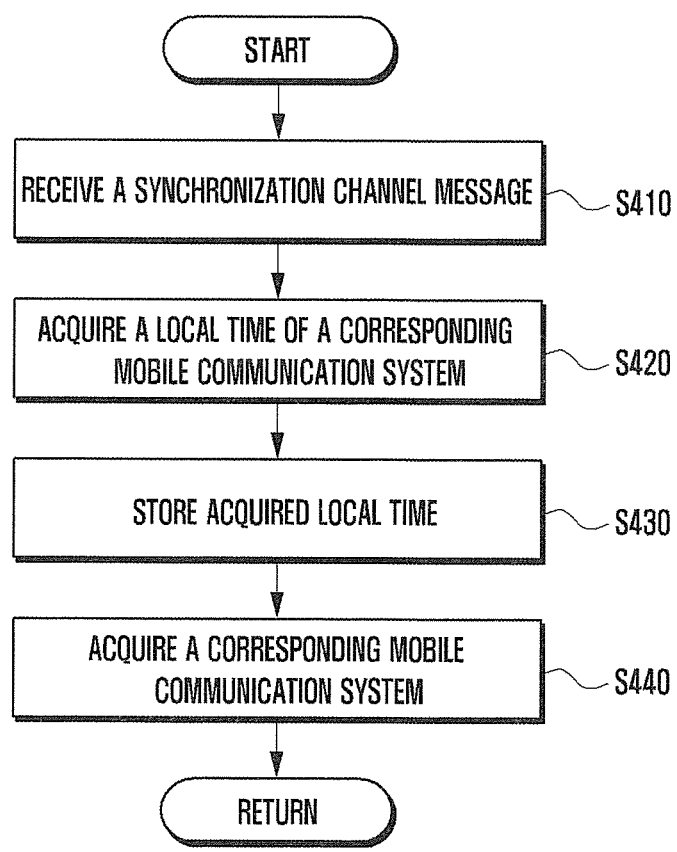
FIG. 4 illustrates a detailed process for acquiring a mobile communication system by the dual mode mobile device.

FIG. 4 illustrates a detailed process in the flow chart of FIG. 3, block S305, for acquiring a mobile communication system by the dual mode mobile device 170.

The controller 270 senses a sync channel message transmitted from a mobile communication system (S410). The controller 270 identifies a local time used by the mobile communication system from the received sync channel message (S420). The controller 270 stores the identified local time in the storage input 250 (S430), and then acquires the mobile communication system (S440).

Figure 5:
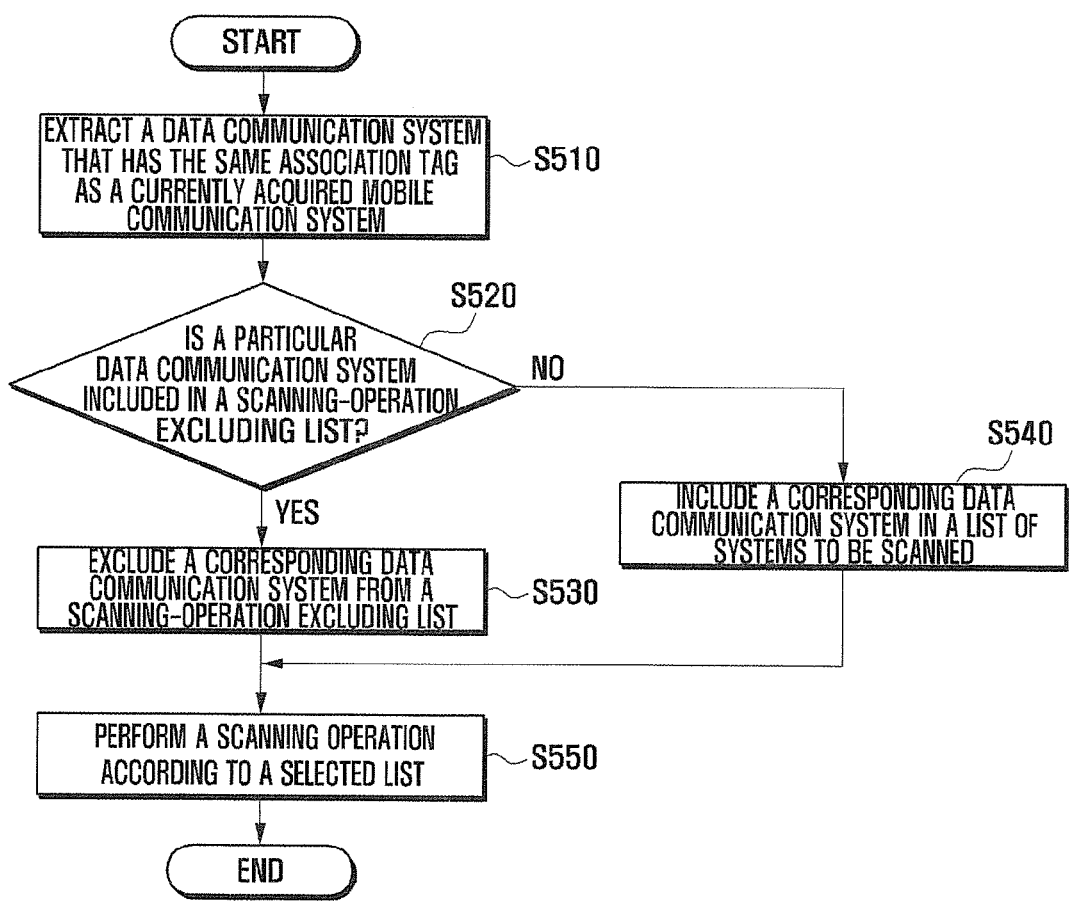
FIG. 5 illustrates a detailed process for scanning mobile communication systems by the dual mode mobile device.

FIG. 5 illustrates a detailed process in the flow chart of FIG. 3, block S350, for scanning mobile communication systems by the dual mode mobile device 170.

The controller 270 extracts data communication systems that have the same Association Tag as a currently acquired mobile communication system, from the Preferred Roaming List (PRL) (S510). The controller 270 determines whether a data communication system from among the extracted data communication systems exists in the scanning-operation excluding list (S520).

When the controller 270 ascertains that a data communication system exists in the scanning-operation excluding list at block S520, it excludes the data communication system from the scanning-operation excluding list (S530). Alternatively, when the controller 270 ascertains that a data communication system does not exist in the scanning-operation excluding list at block S520, it includes all the data communication systems in target systems to be scanned (S540).

After that, the controller 270 scans data communication systems determined via blocks S530 and S540 (S550).

Figure 6:
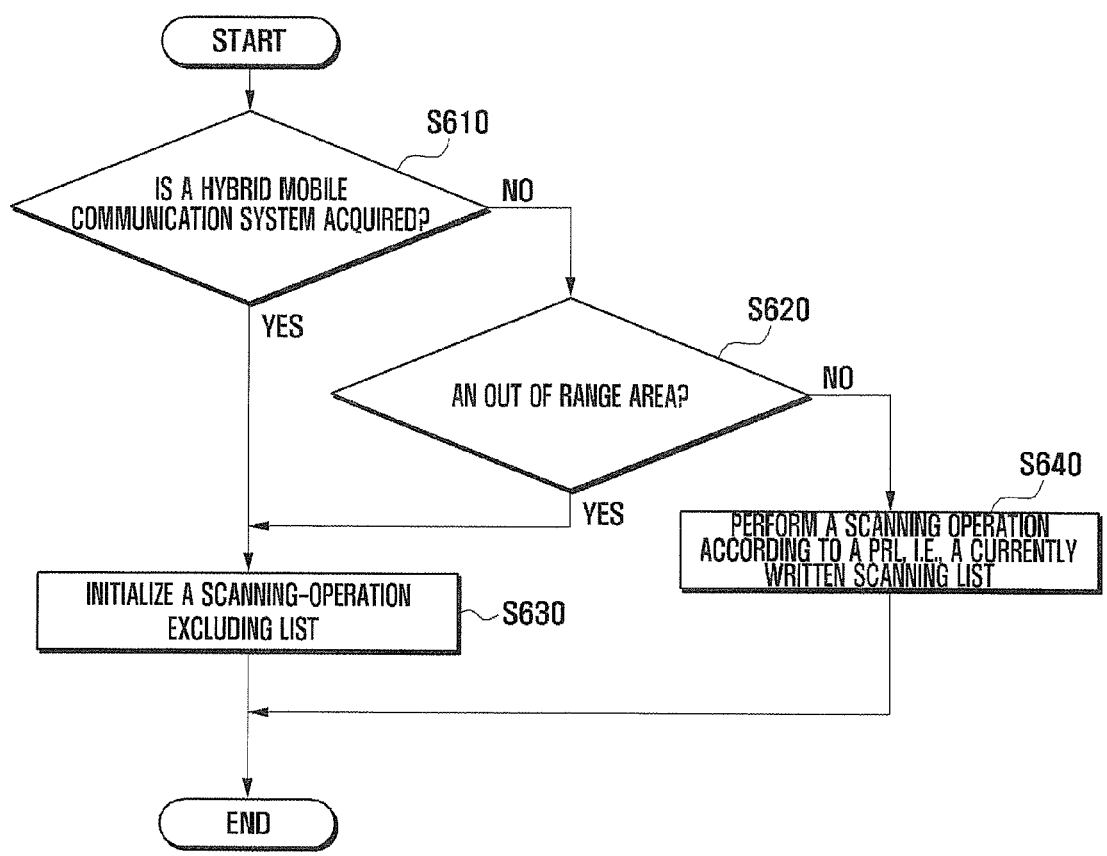
FIG. 6 illustrates a method for initializing a scanning-operation excluding list by a controller, according to an embodiment of the invention.

FIG. 6 illustrates a flow chart that describes a method for initializing a scanning-operation excluding list by the controller 270, according to an embodiment of the invention.

Referring to FIGS. 1 and 6, when the dual mode mobile device 170 acquires the first mobile communication system 130 in the first network 110 that uses a first local time, it avoids scanning and acquiring the second data communication system 160 that uses a second local time. This process has already been described above.

It is assumed that the dual mode mobile device 170 performs a handover from the first mobile communication system 130 to the second mobile communication system 150. Although the dual mode mobile device 170 scans and acquires the second data communication system that uses the second local time, it may exclude the second data communication system from target systems to be scanned because the second data communication system has been included in a scanning-operation excluding list. In order to prevent such a problem from occurring, the controller 270 of the dual mode mobile device 170 initializes the scanning-operation excluding list according to the processes as shown in FIG. 6.

The controller 270 determines whether to acquire a mobile communication system that differs, in terms of type, from a currently acquired mobile communication system (S610), which is called a hetero-type mobile communication system. For example, the determination whether to acquire a hetero-type mobile communication system is also made as the controller 270 determines whether a handover is performed to a base station or a mobile communication system that uses a local time that differs from a local time used by a currently acquired mobile communication system. When the controller 270 acquires a hetero-type mobile communication system at block S610, it initializes a scanning-operation list stored in the storage input 250 (S630). After that, the controller 270 can scan and acquire a data communication system that has the same Association Tag as the currently acquired mobile communication system.

Alternatively, when the controller 270 does not acquire a hetero-type mobile communication system at block S610, it determines whether the dual mode mobile device 170 enters an out of range area (S620). When the controller 270 ascertains that the dual mode mobile device 170 enters an out of range area at block S620, it initializes a scanning-operation list stored in the storage input 250 at block S630. The controller 270 scans all data communication systems in the PRL, and then acquires scanned data communication systems.

When the controller 270 ascertains that the dual mode mobile device 170 does not enter an out of range area at block S620, it scans data communication systems, according to the PRL and the scanning-operation excluding list that is currently written (S640).

As described above, the data-communication system scanning method and apparatus according to the invention can scan data communication systems excluding a data communication system that is using a local time that differs from a local time used by a currently acquired mobile communication system. Therefore, the data-communication system scanning method and apparatus can provide precise time information to users and prevents the dual mode mobile device from malfunctioning.

Although the embodiment according to the method of the invention has been described in such a manner as to acquire a mobile communication system and then to scan a data communication system, it should be understood that the opposite can also be achieved.

In addition, although the dual mode mobile device of the invention refers to a mobile device that can simultaneously acquire a mobile communication system and a data communication system, it should be understood that it can also be defined as a mobile device that can acquire a hetero mobile communication system that uses a CDMA system of a synchronous type and a GSM system of an asynchronous type, for example. The modification of the dual mode mobile device of the invention can also be operated, such as to scan communication systems, according to the same principle described in the description.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A data-communication system scanning method of a dual mode mobile device, the method comprising:
   acquiring a mobile communication system;
   storing a local time used by the acquired mobile communication system;
   identifying a local time used by a sensed data communication system;
   determining whether the local time used by the acquired mobile communication system is identical to the local time used by the sensed data communication system; and
   scanning, when the local time used by the acquired mobile communication system differs from the local time used by the sensed data communication system, data communication systems by excluding the sensed data communication system from target systems to be scanned.

2. The method of claim 1, wherein scanning data communication systems comprises:
   adding the sensed data communication system to a scanning-operation excluding list, where the scanning-operation excluding list comprises data communication systems excluded as target systems to be scanned;
   extracting a data communication system having a same Association Tag as the acquired mobile communication system, from a Preferred Roaming List (PRL) stored in the dual mode mobile device; and
   scanning the remaining data communication systems from among the extracted data communication systems, wherein the remaining data communication systems are data communication systems that are not included in the scanning-operation excluding list.

3. The method of claim 1, wherein storing a local time used by the acquired mobile communication system comprises:
   identifying a local time used by the mobile communication system, from a sync channel message that is transmitted from the mobile communication system; and
   storing the identified local time.

4. The method of claim 1, wherein identifying a local time used by a sensed data communication system comprises identifying a local time used by a data communication system, from a sector parameter message that is transmitted from the data communication system.

5. The method of claim 2, further comprising:
   initializing the scanning-operation excluding list when the dual mode mobile device performs a handover or enters an out of range area.

6. A data-communication system scanning apparatus of a dual mode mobile device, the apparatus comprising:
   a mobile communication unit configured to process transmission and reception of signals to scan and acquire a mobile communication system;
   a data communication unit configured to process transmission and reception of signals to scan and acquire a data communication system;
   a local time managing unit configured to acquire a mobile communication system via the mobile communication unit, store a local time used by the acquired mobile communication system, identify a local time used by a data communication system sensed by the data communication unit, and determine whether the local time used by the acquired mobile communication system is identical to the local time used by the sensed data communication system; and a scanning-operation controlling unit configured to control, when the local time used by the acquired mobile communication system differs from the local time used by the sensed data communication system, the data communication unit to scan data communication systems by excluding the sensed data communication system from target systems to be scanned.

7. The apparatus of claim 6, wherein the scanning-operation controlling unit adds the sensed data communication system to a scanning-operation excluding list, wherein the scanning-operation excluding list comprises data communication systems excluded as target systems to be scanned.

8. The apparatus of claim 7, wherein the scanning-operation controlling unit extracts a data communication system having a same Association Tag as the acquired mobile communication system from a Preferred Roaming List (PRL) stored in the dual mode mobile device, and scans the remaining data communication systems from among the extracted data communication systems, wherein the remaining data communication systems are data communication systems that are not included in the scanning-operation excluding list.

9. The apparatus of claim 6, wherein the local time managing unit identifies a local time used by the mobile communication system, from a sync channel message that is transmitted from the mobile communication system, and stores the identified local time.

10. The apparatus of claim 6, wherein the local time managing unit identifies a local time used by a data communication system, from a sector parameter message that is transmitted from the data communication system.

11. The apparatus of claim 7, wherein the scanning-operation controlling unit initializes the scanning-operation excluding list when the dual mode mobile device performs a handover or enters an out of range area.

12. The apparatus of claim 7, wherein the local time managing unit and the scanning-operation controlling unit are disposed in a controller of the dual mode mobile device.

13. A dual mode mobile device, comprising:
a display unit;
a mobile communication unit configured to process transmission and reception of signals to scan and acquire a mobile communication system;
a data communication unit configured to process transmission and reception of signals to scan and acquire a data communication system; and
a controller, the controller comprising:
a local time managing unit configured to acquire a mobile communication system via the mobile communication unit, store a local time used by the acquired mobile communication system, identify a local time used by a data communication system sensed by the data communication unit, and determine whether the local time used by the acquired mobile communication system is identical to the local time used by the sensed data communication system; and a scanning-operation controlling unit configured to control, when the local time used by the acquired mobile communication system differs from the local time used by the sensed data communication system, the data communication unit to scan data communication systems by excluding the sensed data communication system from target systems to be scanned.

14. The dual mode mobile device of claim 13, wherein the scanning-operation controlling unit adds the sensed data communication system to a scanning-operation excluding list, wherein the scanning-operation excluding list comprises data communication systems excluded as target systems to be scanned.

15. The dual mode mobile device of claim 14, wherein the scanning-operation controlling unit extracts a data communication system having a same Association Tag as the acquired mobile communication system from a Preferred Roaming List (PRL) stored in the dual mode mobile device, and scans the remaining data communication systems from among the extracted data communication systems, wherein the remaining data communication systems are data communication systems that are not included in the scanning-operation excluding list.

16. The dual mode mobile device of claim 13, wherein the local time managing unit identifies a local time used by the mobile communication system, from a sync channel message that is transmitted from the mobile communication system, and stores the identified local time.

17. The dual mode mobile device of claim 13, wherein the local time managing unit identifies a local time used by a data communication system, from a sector parameter message that is transmitted from the data communication system.

18. The dual mode mobile device of claim 14, wherein the scanning-operation controlling unit initializes the scanning-operation excluding list when the dual mode mobile device performs a handover or enters an out of range area.

19. The dual mode mobile device of claim 13, further comprising an input unit.

20. The dual mode mobile device of claim 14, further comprising a storage input configured to store the scanning-operation excluding list.

* * * * *